(12) United States Patent
Wang

(10) Patent No.: US 10,860,649 B2
(45) Date of Patent: Dec. 8, 2020

(54) ZOOMABLE USER INTERFACE FOR TV

(71) Applicant: TCL RESEARCH AMERICA INC., San Jose, CA (US)

(72) Inventor: Haohong Wang, San Jose, CA (US)

(73) Assignee: TCL RESEARCH AMERICA INC., San Jose, CA (US)

( * ) Notice: Subject to any disclaimer, the term of this patent is extended or adjusted under 35 U.S.C. 154(b) by 435 days.

(21) Appl. No.: 15/921,182

(22) Filed: Mar. 14, 2018

(65) Prior Publication Data

US 2019/0286744 A1 Sep. 19, 2019

(51) Int. Cl.
| | | |
|---|---|---|
| *G06F 16/71* | (2019.01) | |
| *G06F 16/738* | (2019.01) | |
| *G06F 16/74* | (2019.01) | |
| *G06F 16/78* | (2019.01) | |
| *H04N 21/431* | (2011.01) | |
| *G06F 16/783* | (2019.01) | |
| *G06F 16/22* | (2019.01) | |

(52) U.S. Cl.
CPC .......... *G06F 16/71* (2019.01); *G06F 16/2246* (2019.01); *G06F 16/738* (2019.01); *G06F 16/743* (2019.01); *G06F 16/784* (2019.01); *G06F 16/7867* (2019.01); *H04N 21/4312* (2013.01)

(58) Field of Classification Search
CPC .. G06F 16/745; G06F 16/738; G06F 16/2246; G06F 16/71; H04N 21/4312
USPC ......................................................... 707/722
See application file for complete search history.

(56) References Cited

U.S. PATENT DOCUMENTS

| | | | | |
|---|---|---|---|---|
| 6,317,750 B1 * | 11/2001 | Tortolani | ................. | G06F 40/18 |
| 8,560,970 B2 * | 10/2013 | Liddington | ............. | G06F 16/54 |
| | | | | 715/853 |
| 8,831,902 B2 * | 9/2014 | Wang | ............... | H04N 21/25875 |
| | | | | 702/119 |
| 8,869,211 B2 * | 10/2014 | Wang | ................... | H04N 21/431 |
| | | | | 725/61 |
| 2003/0126600 A1 * | 7/2003 | Heuvelman | ........ | H04N 5/44543 |
| | | | | 725/35 |
| 2004/0252120 A1 * | 12/2004 | Hunleth | ................. | G06F 3/0482 |
| | | | | 345/440 |

(Continued)

OTHER PUBLICATIONS

Cockburn, et al., A Review of Overview+Detail, Zooming, and Focus+Context Interfaces, ACM Computing Surveys, vol. 41, No. 1, Article 2, Dec. 2008.

(Continued)

*Primary Examiner* — Shahid A Alam
(74) *Attorney, Agent, or Firm* — Anova Law Group, PLLC

(57) ABSTRACT

A method for making a zoomable user interface for a television (TV) comprises the steps of: assigning a plurality of tags to a video title; collecting tags of a plurality of video titles of a video group; building a tag-relationship map based on a relationship of the tags, wherein the tag-relationship map represents a hierarchical structure of the tags in the video group; building a plurality of tag trees based on the hierarchical structure of the tags; calculating each total distance of each of the plurality of tag trees, wherein the total distance of the tag tree is a sum of distances from a root node to all nodes in the tag tree; and displaying the zoomable user interface having a minimum value of the total distance of the tag tree.

19 Claims, 10 Drawing Sheets

(56) References Cited

U.S. PATENT DOCUMENTS

| | | | | |
|---|---|---|---|---|
| 2005/0138570 A1* | 6/2005 | Good | ............ | G06F 3/0481 |
| | | | | 715/789 |
| 2006/0218588 A1* | 9/2006 | Kelts | ............ | H04N 5/44543 |
| | | | | 725/39 |
| 2008/0228749 A1* | 9/2008 | Brown | ............ | G06F 16/78 |
| 2009/0164946 A1* | 6/2009 | Liddington | ............ | G06F 16/54 |
| | | | | 715/853 |
| 2009/0183200 A1* | 7/2009 | Gritton | ............ | H04N 21/8456 |
| | | | | 725/37 |
| 2009/0193356 A1* | 7/2009 | Saba | ............ | G06F 16/904 |
| | | | | 715/801 |
| 2009/0254543 A1* | 10/2009 | Ber | ............ | G06F 16/334 |
| 2010/0229115 A1* | 9/2010 | Augustine | ............ | G06F 3/1454 |
| | | | | 715/800 |

OTHER PUBLICATIONS

Norouzi, et al., Efficient Non-greedy Optimization of Decision Trees, in Proc. NIPS 2015.

Qiusha Zhu, et al., VideoTopic: Modeling User Interests for Content-Based Video Recommendation, International Journal of Multimedia Data Engineering and Management, 5(4), Oct.-Dec. 2014.

Guanghan Ning, et al., Spatially Supervised Recurrent Convolutional Neural Networks for Visual Object Tracking., in Proc. IEEE ISCAS 2017.

Wei Liu, et al., SSD: Single Shot MultiBox Detector, in Proc. ECCV 2016, Cham.

Benjamin B. Bederson, The promise of zoomable user interfaces, Behavior & Information Technology, vol. 30, No. 6, Nov.-Dec. 2011.

Redmon, et al., You Only Look Once: Unified, Real-Time Object Detection, in Proc. IEEE CVPR 2016.

* cited by examiner

ZOOMABLE USER INTERFACE FOR TV

FIELD OF THE DISCLOSURE

The present disclosure relates to the field of user interface technologies and, more particularly, relates to techniques for making zoomable user interface for television (TV).

BACKGROUND

In the application of the TV user interface, the recommendations and the voice search are two dominant means for user interactions. For users with a strong intent or an explicit target, the voice search is a very effective and efficient approach for user to quickly obtain the desired content. On the other hand, the recommendations are very helpful for users without a specific intent but their preferences can be estimated based on the content viewing history or previous content search history. It is very typical for users to click remote buttons dozen or even more times before landing onto a desired content to watch. Generally, two extreme ways (i.e., direct access with specific intent, and multiple clicks with unclear target) are used to select a desired content by the users.

Since the interaction efficiency has been recognized as an important factor of TV user experiences, there is a need for a solution in the middle that can achieve quick content access without an exact intent is provided in the present application by using a zoomable user interface.

BRIEF SUMMARY OF THE DISCLOSURE

One aspect of the present disclosure provides a method for making a zoomable user interface for a television (TV). The method comprises: assigning a plurality of tags to a video title and collecting tags of a plurality of video titles in a video group; building a tag-relationship map based on a relationship of the tags, wherein the tag-relationship map represents a hierarchical structure of the tags in the video group, and a descendent node in the hierarchical structure includes all tags of an ancestor node in the hierarchical structure; building a plurality of tag trees based on the hierarchical structure of the tags, wherein each of the plurality of tag trees corresponds to a tree level p, a tag number g and a cluster number q of the zoomable user interface; calculating each total distance of each of the plurality of tag trees, wherein the total distance of the tag tree is a sum of distances from a root node to all nodes in the tag tree; and displaying the zoomable user interface having a minimum value of the total distance of the tag tree.

Another aspect of the present disclosure provides a television (TV) system. The system comprises a TV set displaying a zoomable user interface. The TV set comprises a processor; a memory coupled to the processor; and a plurality of program units stored in the memory to be executed by the processor to display the zoomable user interface. The plurality of program units comprises: an assignment unit for assigning a plurality of tags to a video title and collecting tags of a plurality of video titles in a video group; a structure building unit for building a tag-relationship map based on a relationship of the tags, wherein the tag-relationship map represents a hierarchical structure of the tags in the video group, and a descendent node in the hierarchical structure includes all tags of an ancestor node in the hierarchical structure; a tag tree building unit for building a plurality of tag trees based on the hierarchical structure of the tags, wherein each of the plurality of tag trees corresponds to a tree level p, a tag number g and a cluster number q of the zoomable user interface; a calculation unit for calculating each total distance of each of the plurality of tag trees, wherein the total distance of the tag tree is a sum of distances from a root node to all nodes in the tag tree; and a displaying unit for displaying the zoomable user interface having a minimum value of the total distance of the tag tree on the TV set.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, persons of ordinary skill in the art may derive other embodiments consistent with the present disclosure, all of which are within the scope of the present invention.

The present disclosure provides a zoomable user interface. The zoomable user interface could work along with the voice search and recommendations very well to generate seamless experiences for TV world. Furthermore, the zoomable user interface has special advantage for kid audiences due to its visual rich nature, as most of the kids are visual sensitive (and some of them even cannot read) and more eager to try new innovations.

The application of presenting a zoomable user interface for TV includes several considerations. First of all, from a perceptual point of view, how to present a video title in a zoomable architecture that makes sense need to be addressed. Second, what kind of information are needed to best represent a video title in computation and how to obtain these information effectively, given each video title may have more than 100K frames. Third, what kind of algorithm may help find an optimal solution to present the zoomable user interface given the information obtained from the video titles. In the present application, the deep learning is used to achieve the significant performance in the video object detection, recognition and tracking, and image understanding. The deep learning may be utilized in handling the considerations mentioned above and automatically extracting information to represent the video titles.

Figure 1:
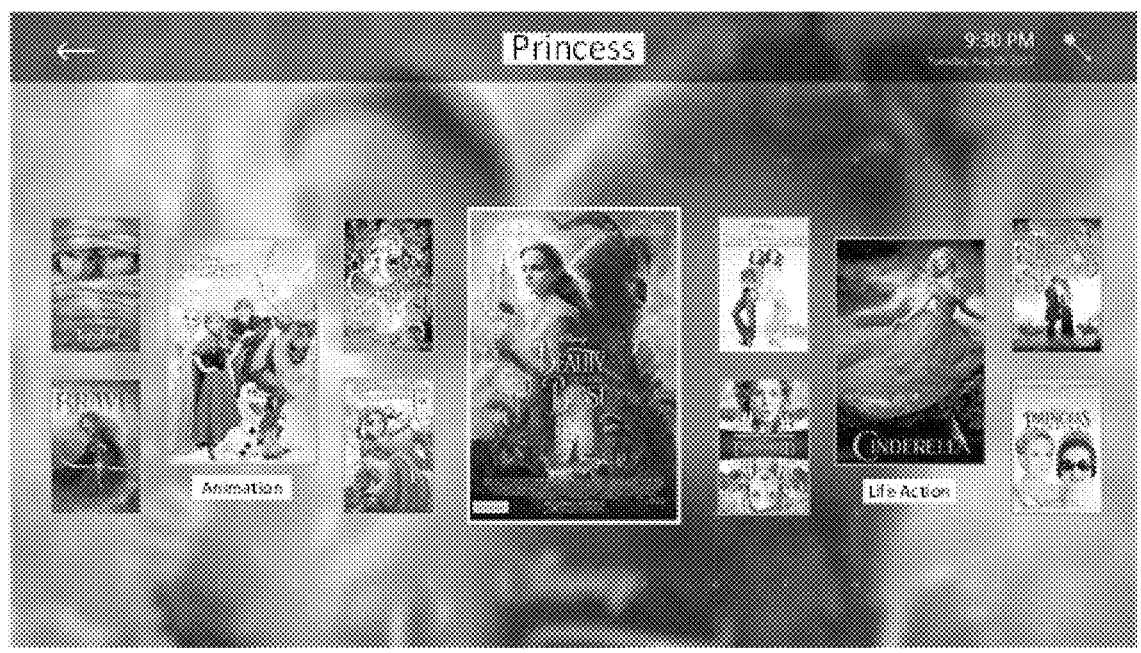
FIG. 1 illustrates an exemplary zoomable user interface for a TV consistent with various disclosed embodiments.

FIG. 1 illustrates an exemplary zoomable user interface for a TV consistent with various disclosed embodiments. As shown in FIG. 1, a zoomable user interface is represented by a cascaded visual tag tree, in which the associated tags of video titles play significant roles in building up the zoomable user interface structure as well as supporting the zoom interactions. As shown in FIG. 1, a level of details of the zoomable user interface regarding to the tag of "Princess" is presented, which is divided into 2 clusters, on the left with tag "Animation" and the right with tag "Live action." Clearly with the cascaded tags, "Princess" to "Animation", users may easily navigate into the set of movies belong to this category and enter to next details with one more tag cascaded. Many tags may be automatically annotated by deep learning algorithms.

Figure 2:
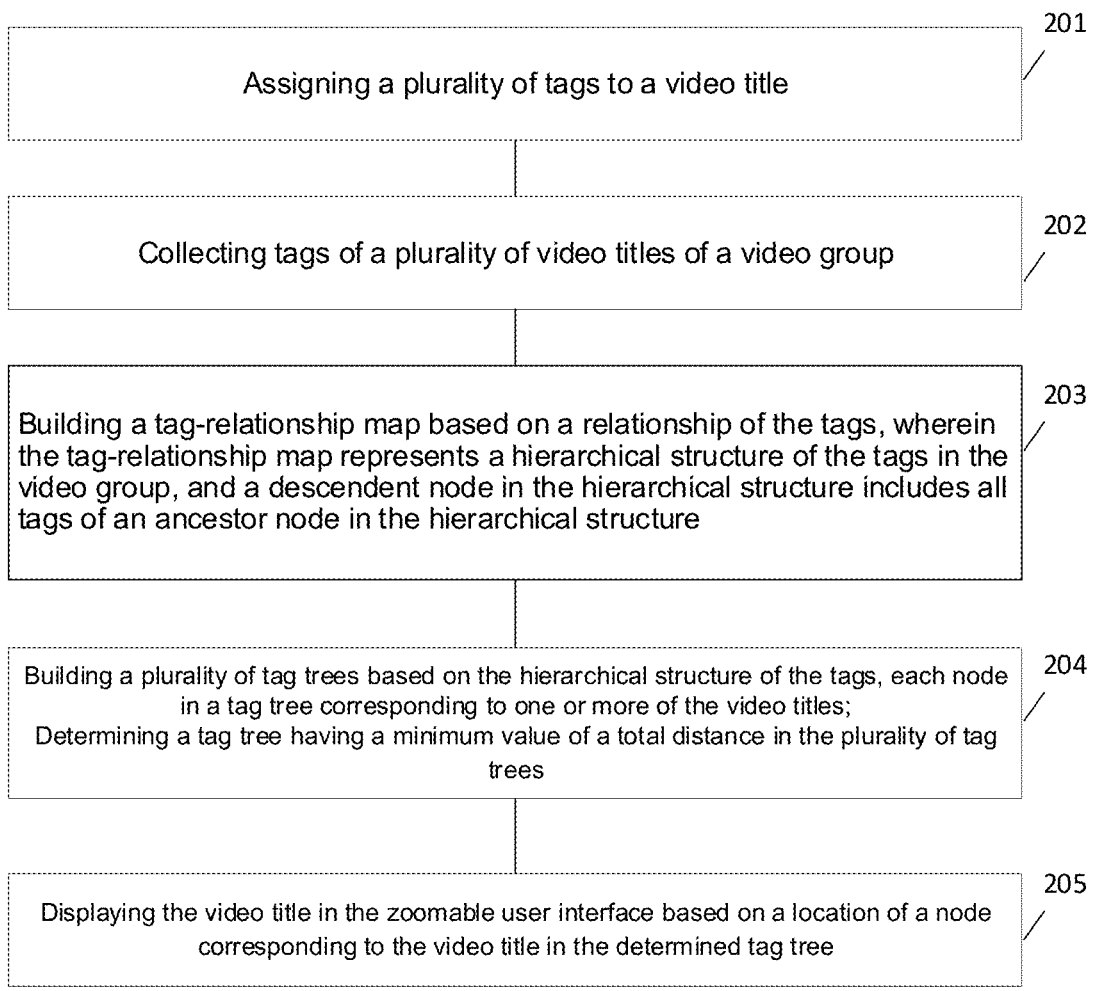
FIG. 2 illustrates a flow chart of an exemplary method for making a zoomable user interface for a TV consistent with various disclosed embodiments.

FIG. 2 illustrates a flow chart of an exemplary method for making a zoomable user interface for a TV consistent with various disclosed embodiments. In step 201, a plurality of tags are assigned to a video title. Tags with semantic meanings have been very important features to represent the video titles. For example, as indicated by IMDB video meta-data database, a video title may be represented by hundreds of tags, such as genre, actors, actresses, directors, and so on. In the present embodiments of the zoomable user interface framework, the visual representation of the title would play more significant roles, as kids are very sensitive for visual elements on the posters of a title.

In the cascaded tag design, the tags may be built into a hierarchical structure that include foreground object (e.g., human, animal, imaginary human, alien, toy, etc), background scene (e.g, sky, safari, ocean, indoors, farm, castle, and so on), expressional perception (e.g., adventure, magical, cute, funny, powerful, etc), relationship indication (e.g., individual, family, team, hostility, and so on), and many others. The lower-level tags may be very specific, for example, the animal species may include home raised ones like cat, dog, pig, and duck, wild ones like bear, monkey, zebra, and elephant, extinct ones like dinosaur, dragon, and unicorn, powerful ones like tiger, lion and leopard. The animal species may also include animals in the sky (e.g. birds), ocean (e.g. turtle, fish), and so on.

Figure 3:
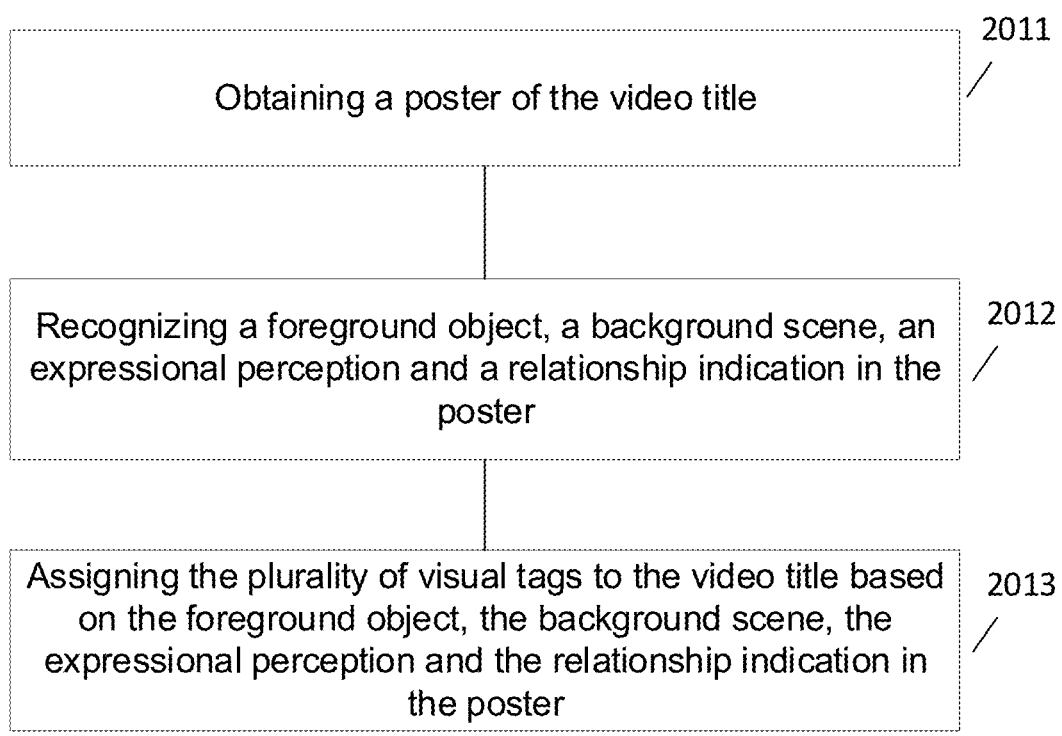
FIG. 3 illustrates another flow chart of an exemplary method for making a zoomable user interface for a TV consistent with various disclosed embodiments.

In one embodiment of the present application, the tags of a video title may be matched very well with the poster, so that they may visually represent the video well during the user's zoomable user interface navigation process. FIG. 3 illustrates another flow chart of an exemplary method for making a zoomable user interface for a TV consistent with various disclosed embodiments. As shown in FIG. 3, the step 201 may further comprises obtaining a poster of the video title (Step 2011); recognizing a foreground object, a background scene, an expressional perception and a relationship indication in the poster (Step 2012); and assigning at least some of the plurality of tags to the video title based on the foreground object, the background scene, the expressional perception and the relationship indication in the poster (Step 2013).

In another embodiment of the present application, additional information besides the poster of the video title are processed to extract tags representing the video content. For example, in case a group of animals are shown on the poster, it is not clear which one is the main character. By referring to the video frames and based on the appearance frequency of these characters, the main character may be determined.

Figure 4:
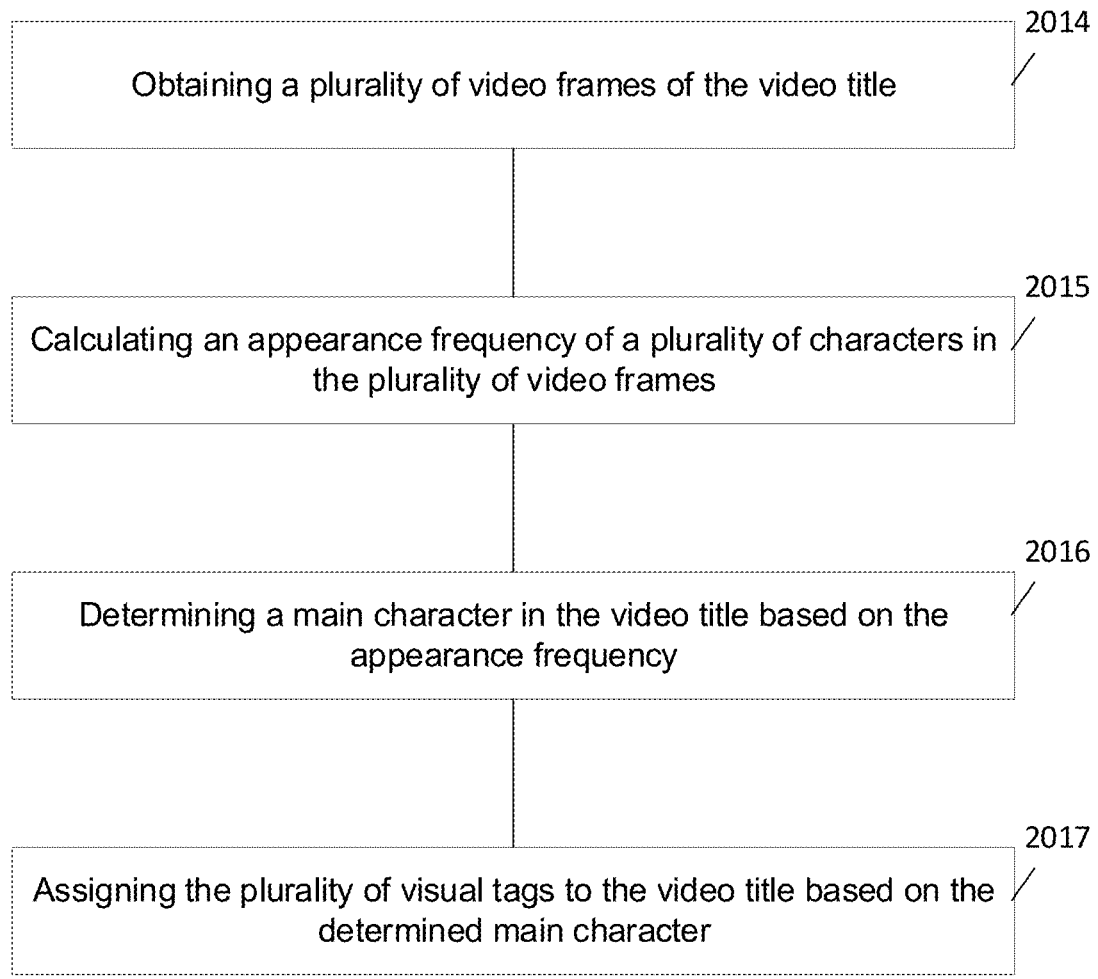
FIG. 4 illustrates a further flow chart of an exemplary method for making a zoomable user interface for a TV consistent with various disclosed embodiments.

FIG. 4 illustrates another scenario of an exemplary information presentation system consistent with various disclosed embodiments. As shown in FIG. 4, the step 201 may further comprises obtaining a plurality of video frames of the video title (Step 2014); calculating an appearance frequency of a plurality of characters in the plurality of video frames (Step 2015); determining a main character in the video title based on the appearance frequency (Step 2016); and assigning at least one of the plurality of tags to the video title based on the determined main character (Step 2017). In some embodiments, before performing step 2015, step 201 may further include: determining the plurality of characters based on characters appeared on the poster of the video title. In some embodiments, duo main characters may be identified based on the appearance frequency.

Figure 5:
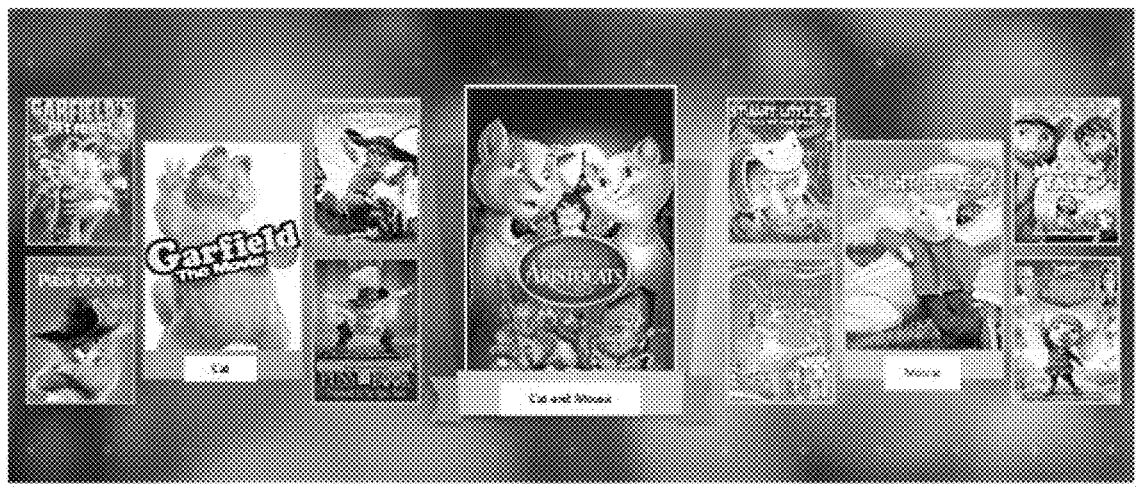
FIG. 5 illustrates the grouped posters in the exemplary zoomable user interface consistent with various disclosed embodiments.

FIG. 5 illustrates the grouped posters in the exemplary zoomable user interface consistent with various disclosed embodiments. In FIG. 5, the group of posters may be classified by matching the posters. As shown in FIG. 5, under the category "cat and mouse," the group of posters on the left side are classified against the group on the right side, as the former has strong elements of cats, and later focuses on mouse.

Referring to FIG. 2 again, in step 202, the tags of a plurality of video titles of a video group are collected. Then, the all collected tags are used for building a tag-relationship map based on a relationship of the tags, as shown in step 203. The tag-relationship map may represent a hierarchical structure of the tags in the video group, and a descendent node in the hierarchical structure includes all tags of an ancestor node in the hierarchical structure.

The cascaded tags, especially visual tags, of the video titles play significant roles in the zoomable user interface experience for video poster organization and presentation. The cascaded tags may enable to achieve a zoomable data structure, that is, when iterate the tree from root to leaves, the descendent node inherits all tags of its parent and ancestors, which means that all video titles in the video group represented by a descendent node must have all tags that used in its ancestor nodes.

Figure 6:
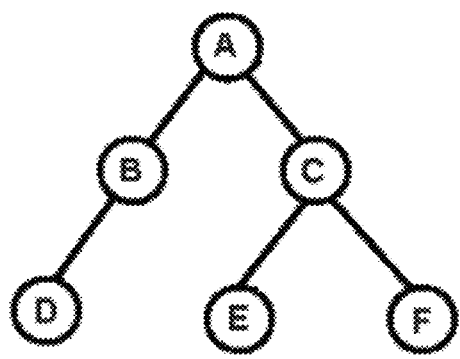
FIG. 6 illustrates a binary tree applied for the exemplary zoomable user interface consistent with various disclosed embodiments.

FIG. 6 illustrates a binary tree applied for the exemplary zoomable user interface consistent with various disclosed embodiments. As shown in FIG. 6, a binary tree is made of nodes, where each node contains a "left" reference, a "right" reference, and a data element. The topmost node in the tree is called the root. Every node (excluding a root) in a tree is connected by a directed edge from exactly one other node. This node is called a parent. On the other hand, each node can be connected to arbitrary number of nodes, called children. Nodes with no children are called leaves, or external nodes. Nodes which are not leaves are called internal nodes. Nodes with the same parent are called siblings. The depth of a node is the number of edges from the root to the node. The height of a node is the number of edges from the node to the deepest leaf. The height of a tree is a height of the root.

Figure 7:
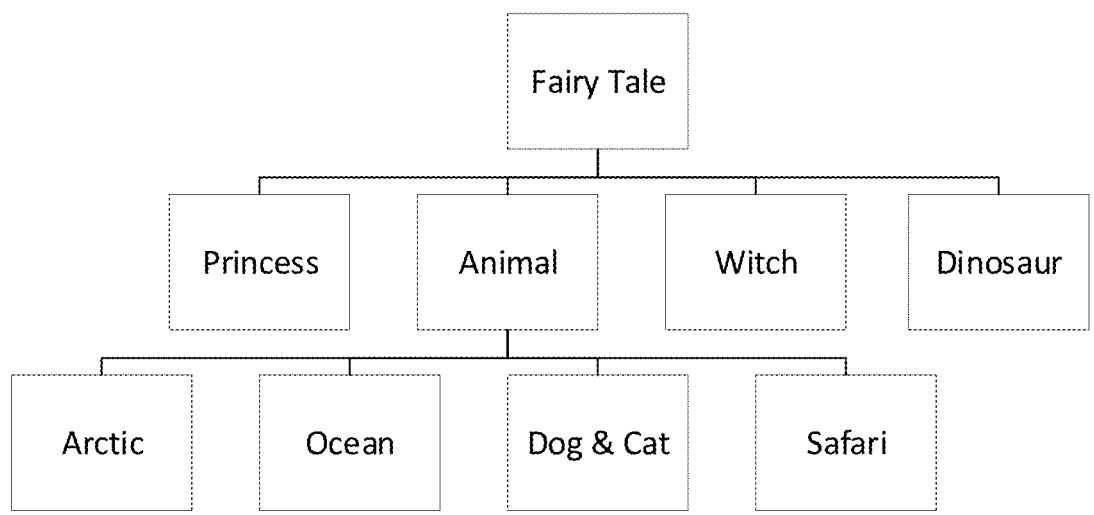
FIG. 7 illustrates a hierarchical structure of the tags in the video group applied for the exemplary zoomable user interface consistent with various disclosed embodiments.

FIG. 7 illustrates a hierarchical structure of the tags in the video group applied for the exemplary zoomable user interface consistent with various disclosed embodiments. In the embodiment shown in FIG. 7, the node of "Animals Ocean" selects the tag of "Ocean" and inherits the tag from its parent (i.e., "Animal") and that of the parent of its parent (i.e. "Fairy Tale"). Therefore, it represents the group of video titles containing the tags of {"Fairy Tale", "Animal", "Ocean"}, and the tree structure decided the hierarchy of "Fairy Tale"->"Animal"->"Ocean", which reflects also the flow of user operation shown in the zoomable user interface illustrated in FIG. 8.

Figure 8:
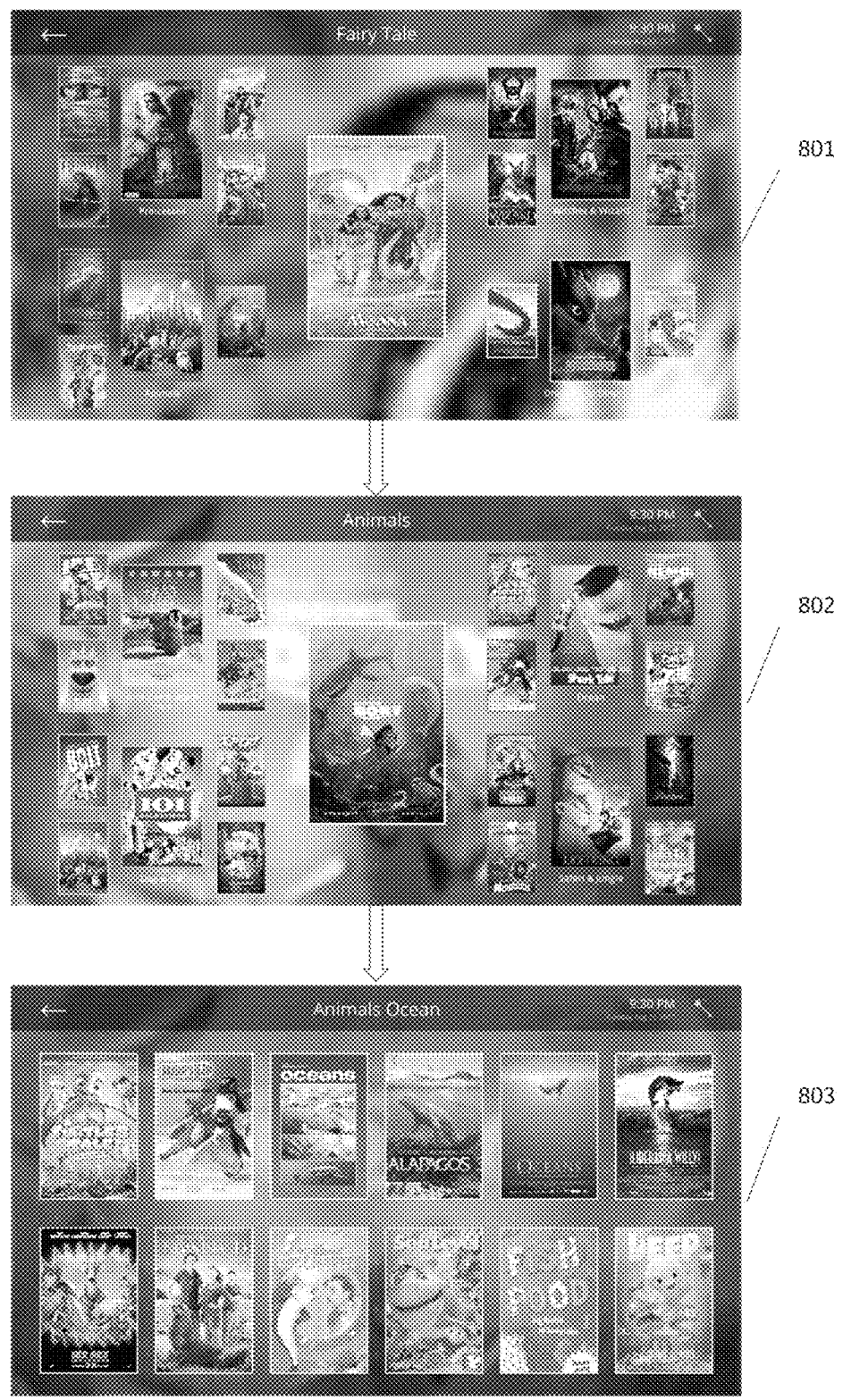
FIG. 8 illustrates a flow of the user operation of an exemplary zoomable user interface consistent with various disclosed embodiments.

When a tag tree is built based on the hierarchical structure shown in FIG. 7, the zoomable user interface may be formed as shown in FIG. 8. The tag tree may adopt a part or all of the hierarchical structure (e.g., tag-relationship map) shown in FIG. 7. Further, each node of the tag tree is associated with one or more video titles; and each video title is associated with one or more nodes in the tag tree. That is the zoomable user interface can present a video title based on a level of its corresponding node in the tag tree. For example, when the user enters or chooses "Fairy Tale," a first level interface 801 of the zoomable user interface may be shown on the display of the TV set. The first level interface 801 shows 5 clusters of posters (i.e. video titles), including a poster of movie "Moana" of the main category "Fairy Tale" (i.e. root node) and posters associated with four sub categories (first level nodes in the tag tree) "Princess," "Animal," "Witch," and "Dinosaur." That is, the posters are determined and shown based on the first level nodes and the root node of the tag tree built based on the hierarchical structure shown in FIG. 7. When the user chooses "Animal," a second level interface 802 of the zoomable user interface may be shown on the display of the TV set. In the second level interface 802, four sub categories "Arctic," "Ocean," "Dog & Cat," and "Safari" and their respective corresponding posters are shown based on the second level of the tag tree built based on the hierarchical structure shown in FIG. 7. When the user choose "Ocean," a third level interface 803 of the zoomable user interface may be shown on the display of the TV set. In the third level interface 803, the video titles match the tag titles assigned to the leave node "Ocean" in the hierarchical structure shown in FIG. 7.

The cascaded tag tree structure in the present application may be similar to the Decision Tree, where the attribute test conditions may be cascaded to form the tree structure. The utilization of cascaded tag tree to create the zoomable user interface experiences provides sufficient flexibility for the user experience (UX) creators to determine the exact group of tags to be used as well as the priority of them. For example, the UX creator may determine to use "Ocean Animal" as a single tag or split it to multiple tags such as "Ocean", "Animal" and so on. The tags may also be assigned with different weights so that they will be selected in different priorities to either match user's preferences or the creator's specific design needs.

By implementing the cascaded tag tree structure with zoomable user interface, the number of user interactions to reach a video title has high correlation with the depth of the title inside the tree, in other words, if a video title (as a leave node in the tree) is 3-edge away from the root, it means the user needs to click the zoom-in button 3 times in the zoomable user interface structure to enter the page with the video title listed. The disclosed application aims to minimize the overall user interactions to locate a video title and provides an efficient method to allocate tags to each node of the tag tree to form an optimized tag tree structure. That is, the disclosed method addresses a tag allocation optimization problem to reduce overall user interactions to locate a video title.

Figure 9:
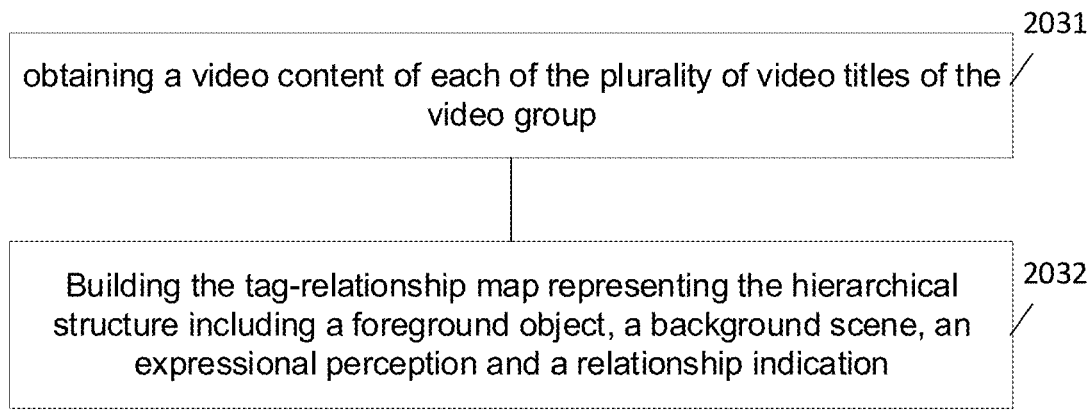
FIG. 9 illustrates a further flow chart of an exemplary method for making a zoomable user interface for a TV consistent with various disclosed embodiments.

FIG. 9 illustrates a further flow chart of an exemplary method for making a zoomable user interface for a TV consistent with various disclosed embodiments. As shown in FIG. 9, the step 203 may further comprises obtaining a video content of each of the plurality of video titles of the video group (Step 2031); and building the tag-relationship map representing the hierarchical structure (Step 2032). In some embodiments, the category of the hierarchical structure includes a foreground object, a background scene, an expressional perception and a relationship indication.

Referring to FIG. 2 again, in the Step 204, a plurality of tag trees are built based on the hierarchical structure of the tags, wherein each of the plurality of tag trees corresponds to a tree level p, a tag number g and a cluster number q of the zoomable user interface. Let us denote by $V=\{v_1, v_2, \ldots, v_m\}$ the set of video titles, and m is the total number of video titles, $G=\{g_1, g_2, \ldots, g_k\}$ the set of k tags, where the tags include both visual tags (e.g., background tags) and non-visual ones, such as genre, actors, and so on. For obtaining an optimal tree $T=\{T_0, T_1, \ldots, T_p\}$ with root of $T_0$ and height of p, and each node may have q children, q is in the range of [a, b] which is application specific. For example, if a=2, b=6, it means the UI page may have two to six clusters of posters. In some embodiments, each video title in V corresponds to one poster. Each video title in V may correspond to one or more tags in G, and each tag in G may describe one or more video titles in V.

In each level of T, selecting a tag to be placed at a j-th node $t_{i,j}$ of $T_i$ (i=1, . . . , p) needs to meet some specific criteria. The specific criteria includes: when a single tag $g(t_{i,j})$ from the set G is selected, the cascaded tag (i.e., $g(t_{i,j})$ and the selected tag in its ancestor nodes in T) is used to calculate the set of associated video titles $v(t_{i,j})$, which is a subset of V. Further, when a fixed UI capacity U (i.e., the number of posters a UI page may hold, such as U=20) is set, if $|v(t_{i,j})|>U$, then $t_{i,j}$ is not a leaf node and it will have children, otherwise, it will become a leaf node.

During the tree forming process, a number of variables need to be optimized, that includes the height p, the tag selection $g(t_{i,j})$, and the number of children $q(t_{i,j})$ of each node. It is important to assure that all video titles in V (or more than certain percentage of V) appear in the leave nodes of the tag tree to satisfy coverage expectation. As each edge of the tree represents a user selection to move into the next level of the zoomable user interface, a tag tree representing the minimum number of expected user interactions to every title in V may be obtained. The minimum number of expected user interactions E to every title in V is calculated as:

$$E[L] = \frac{\sum_{\forall t_{i,j}} i \text{ if } |v_{i,j}| \le U}{Z},$$

where Z is the total number of leave nodes of T, and L is used to represent the total distance of all leaves to root. The total distance of the tag tree is a sum of distances from a root node to all nodes in the tag tree. Hence, $$L = \sum_{\forall t_{i,j}} i \text{ if } |v_{i,j}| \le U.$$

In some embodiments, when building the tag trees based on the hierarchical structure of the tags, a total distance penalty D of each tag tree may be calculated. From user interest modeling and user experience creator's inputs, a tag-relationship map (e.g., the animation/live tag selection is in higher preference than background tag selection) may be used to guide the tag selection during the tree forming process. Each connected node pair of the cascaded tag tree (where upper level tags are treated as high-priority ones) need to be checked with the tag-relationship map to calculate the total distance penalty D.

$$D = \sum_{allpairs} d(t_{i,j}, t_{i+1,j'}),$$

where $t_{i,j}$ and $t_{i+1,j'}$ are connected tags in neighbor levels in the final selected cascaded tag tree, and d=1 if there is a conflict between the tag-relationship map and the order in the tree (otherwise d=0 by default).

In some embodiments, the formed tag tree may not cover all tags in G, and not all tags related to a video title are placed along the path from the root node to the leave node in the tag tree. The coverage expectation value C is a percentage that the video titles of the video group appears in the leave nodes of the tag tree. For a specific node $t_{i,j}$ with selected $q(t_{i,j})$ number of children $t_{i+1,j1}, \ldots, t_{i+1,jq}$, the coverage of the specific node $C(t_{i,j})$ can be calculated as:

$$C(t_{i,j}) = \frac{\sum_{k=1}^{q(t_{i,j})} |v_{i+1,j_k}|}{|v_{i,j}|}.$$

The tag allocation optimization problem (i.e. forming an optimal hierarchical tag tree for the zoomable user interface that minimizes user interactions to locate a video title) is formulized as: to minimize L, such that $D \le D_{threshold}$ and $C(t_{i,j}) \le C_{threshold}$ for all $t_{i,j}$, where Cthreshold and Dthreshold are used to control the experience expectations.

An optimal cascade tag tree T with a minimum total length (which indicates the user interaction frequency and efficiency) may be found, when given constraints on user preferences and coverage. The parameters p, $g(t_{i,j})$ and $q(t_{i,j})$ for every potential node $t_{i,j}$ in the tree T are calculated in the optimization process. Thus, the equation of L may be rewritten below as the results of the total distance for node $T_0$ after optimization functions g and q:

$$L = L(T_0) = \min_{g,q} L(g(t_{0,0}), q(t_{0,0})),$$

and it may be further derived into a format of recursive function as follows:

$$L(g(t_{0,0}), g(t_{1,j_1}), \ldots, g(t_{i-1,j_{i-1}}), g(t_{i,j_i}), q(t_{i,j_i})) =$$
$$\begin{cases} 1 & \text{if } |v(t_{i,j_i})| \le U \\ \min_{g,q} \sum_{k=1}^{q(t_{i,j})} L(g(t_{0,0}), \ldots, g(t_{i+1,j_{i+1}^k}), q(t_{i+1,j_{i+1}^k})) & \text{otherwise} \end{cases},$$

which can be simplified into:

$$L(g(t_{i,j_i}), q(t_{i,j_i})) = \min_{g,q} \sum_{k=1}^{q(t_{i,j})} L(g(t_{i+1,j_{i+1}^k}), q(t_{i+1,j_{i+1}^k})).$$

It should be noted that the function L( ) above are dependent on the selections of nodes in the path from root to the current node $t_{i,ji}$.

Similarly, the equation for calculating the total distance penalty D may be represented as:

$$D(g(t_{i,j_i}), q(t_{i,j_i})) = \sum_{k=1}^{q(t_{i,j_i})} [d(t_{i,j_i}, t_{i+1,j_{i+1}^k}) + D(g(t_{i+1,j_{i+1}^k}), q(t_{i+1,j_{i+1}^k}))].$$

Further, a Lagrange multiplier method may be used to relax the user preference constraints for the optimization problem to minimize L. The Lagrangian relaxation method leads to a convex-hull approximation. Let W be the set of all possible decision vectors $w_i = \{[g(t_{i,j}), q(t_{i,j})]\}$. The Lagrangian cost function may be defined as: $J_\lambda(w) = L + \lambda D$, where $\lambda$ is the Lagrangian multiplier. It may be derived that if there exists a $\lambda^*$ such that $$w^* = \arg[\min_w J_\lambda(w)],$$

which leads $D = D_{threshold}$, then $w^*$ is also an optimal solution to minimize L, in which it is assumed that the coverage check condition (e.g. related to $C(t_{i,j})$) is also met (the ones cannot satisfy the constraint will be discarded during the admissible vector selection process).

The Lagrangian cost function may be further represented by:

$$\min J_\lambda(w_i) = \min \sum_{k=1}^{q} \{L(w_{i+1}) + \lambda[d(w_{i+1}) + D(w_{i+1})]\},$$

for the i-th level node in the tag tree. Due to the dependency of L( ), as mentioned above, the selection of $\{w_i\}$ is dependent on the nodes in the path from root to the current node. In some cases, it may raise concerns if nodes in the tag tree grows as the level of tag tree grows and eventually make the search space to a size of exponential magnitude. It should be noted that such situation is unlikely to happen since more than 99% of admission options for the nodes in the tree belong to the case that $$|v(t_{i,j_i})| \le U.$$

It is understandable that with moving one level lower in the tag tree, one more tag is added in the sifting process which causes less video titles meet the requirement, and eventually a node may become a leaf node (when the UI capacity U cannot be satisfied).

Referring to FIG. 2 again, in Step 205, after a minimum value of the total distance of the tag tree is obtained or optimized, a zoomable user interface is displayed on the TV.

Figure 10:
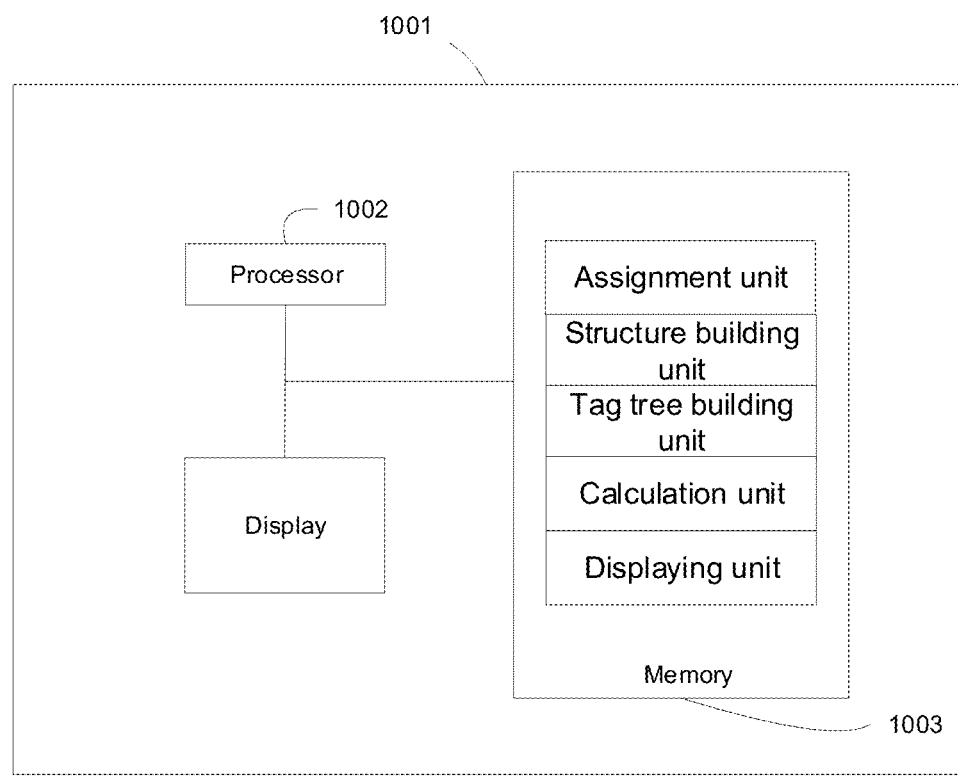
FIG. 10 illustrates an exemplary TV system using the zoomable user interface consistent with various disclosed embodiments.

The embodiments of the present application further disclose a TV system. As shown in FIG. 10, the TV system includes a TV set 1001 displaying a zoomable user interface. The TV set 1001 comprises a processor 1002 and a memory 1003 coupled to the processor 1002. Further, a plurality of program units are stored in the memory 1003 to be executed by the processor 1002 to display the zoomable user interface.

The plurality of program units comprises an assignment unit, a structure building unit, a tag tree building unit, a calculation unit and a displaying unit. The assignment unit is configured for assigning a plurality of tags to a video title and collecting tags of a plurality of video titles in a video group. The structure building unit is configured for building a tag-relationship map based on a relationship of the tags, wherein the tag-relationship map represents a hierarchical structure of the tags in the video group, and a descendent node in the hierarchical structure includes all tags of an ancestor node in the hierarchical structure. The tag tree building unit is configured for building a plurality of tag trees based on the hierarchical structure of the tags, wherein each of the plurality of tag trees corresponds to a tree level p, a tag number g and a cluster number q of the zoomable user interface. The calculation unit is configured for calculating each total distance of each of the plurality of tag trees, wherein the total distance of the tag tree is a sum of distances from a root node to all nodes in the tag tree. The displaying unit is configured for displaying the zoomable user interface having a minimum value of the total distance of the tag tree on the TV set.

In one embodiment of the present application, the tags of a video title may be matched very well with the poster, so that they may visually represent the video well during the user's zoomable user interface navigation process. Therefore, the assignment unit may be further configured for obtaining a poster of the video title; recognizing a foreground object, a background scene, an expressional perception and a relationship indication in the poster; and assigning the plurality of visual tags to the video title based on the foreground object, the background scene, the expressional perception and the relationship indication in the poster.

In another embodiment of the present application, the poster of the video title may be not sufficient in representing the video content. For example, in case a group of animals are shown on the poster, it is not clear which one is the main character. By referring to the video frames and based on the appearance frequency of these characters, the main character may be determined.

Hence, the assignment unit may be further configured for obtaining a plurality of video frames of the video title; calculating an appearance frequency of a plurality of char-acters in the plurality of video frames; determining a main character in the video title based on the appearance frequency; and assigning the plurality of visual tags to the video title based on the determined main character.

In another embodiment, the structure building unit may be further configured for obtaining a video content of each of the plurality of video titles of the video group; and building the tag-relationship map representing the hierarchical structure including a foreground object, a background scene, an expressional perception and a relationship indication.

Figure 11:
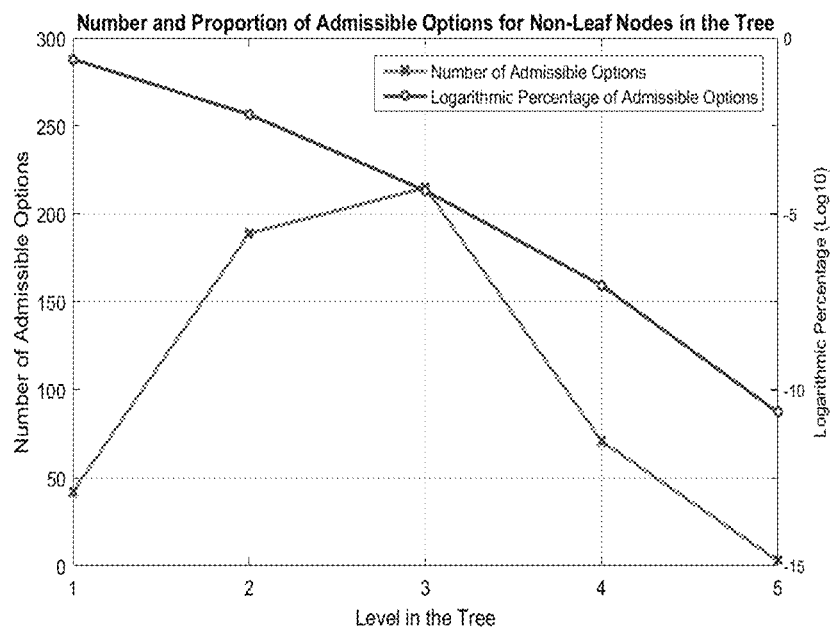
FIG. 11 illustrates an exemplary calculation for making a zoomable user interface for a TV consistent with various disclosed embodiments.

FIG. 11 shows an example for a title set of around 1000 movies using a list of 167 tags. The result shows that when getting into certain depth in the tree (e.g., level 3), the admissible options for non-leaf nodes starts to drop quickly, which means only a small number of options been involved in the heavy computation in recursive function and cost function. This can also indicate that the computation requirement in this optimal solution would be a polynomial problem instead of exponential. Therefore, the Lagrangian cost function may be resolved by recursively finding w for all nodes in each level from the lowest level to the root step by step.

In another embodiment of the present application, a system is deployed with the following setup that a smart TV with embedded system, and a pointing device (like a magic wand) that may wake up the kids channel with the zoomable user interface, and may point to the TV (using its IR component) to select a title for playback, or zoom in/out the current view of the zoomable user interface. An experiment of the system went through a subject test with 20 kids divided in 4 age groups, and the majority of kids is able to master this new user experience model very quickly and can achieve the goal without assistance.

Figure 12:
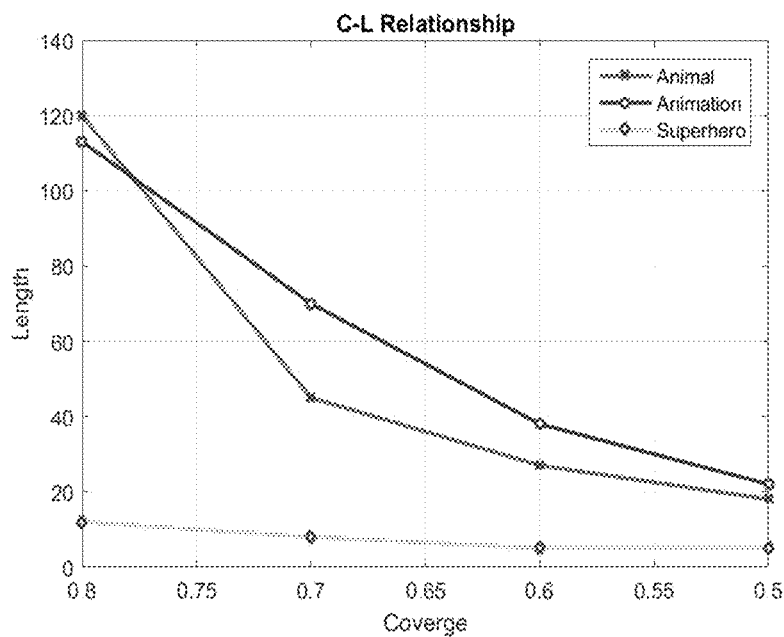
FIG. 12 illustrates an exemplary calculation for making a zoomable user interface for a TV consistent with various disclosed embodiments.
Figure 13:
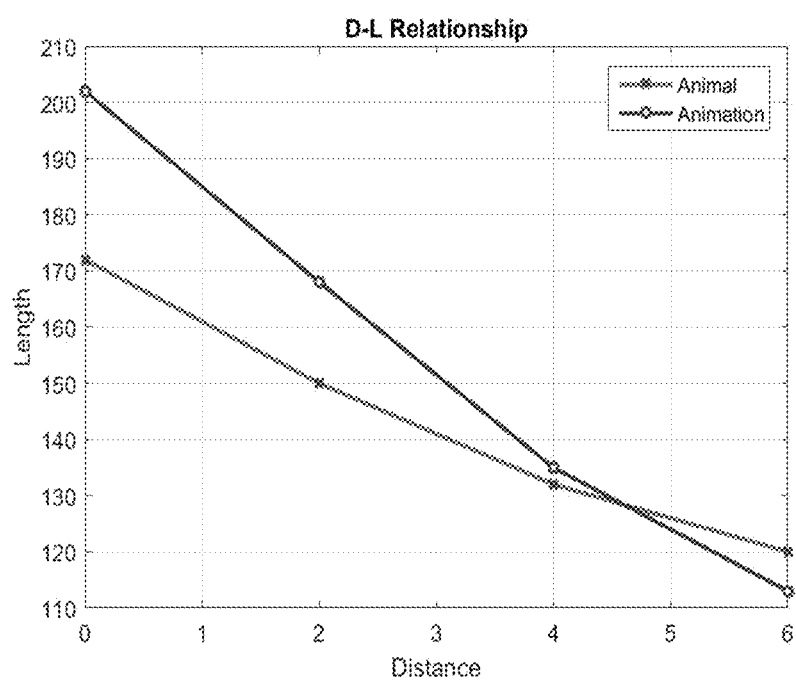
FIG. 13 illustrates an exemplary calculation for making a zoomable user interface for a TV consistent with various disclosed embodiments.

On the other hand, the optimal solution in section 4 was tested with a number of video groups like "animal", "animation", and "superhero". As shown in FIG. 12, the relationship between L and C are quite consistent for all video groups. When the constraint on coverage gets looser, the total length (or user interactions) may be shorter. From another angle, the relationship between L and D is demonstrated in FIG. 13.

The present disclosure proposes a novel application of a zoomable user interface for the TV. The zoomable user interface could significantly enhance the user experience model for the TV usage, especially for the immediate target group of kids. By manipulating a pointing device with only 3 control buttons: select/playback, zoom in, and zoom out, a kid could easily master this new experience. The zoomable user interface representation of TV user interface could be automatically generated by optimizing and forming a cascaded visual tag tree, which is scalable for even very large number of video titles. The advances of deep learning also help the generation of visual tags.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

What is claimed is:

1. A method for making a zoomable user interface for a television (TV) system, comprising:
    assigning, by a processor of the TV system, a plurality of tags to a video title;
    collecting, by the processor, tags of a plurality of video titles of a video group;

building, by the processor, a tag-relationship map based on a relationship of the tags, wherein the tag-relationship map represents a hierarchical structure of the tags in the video group, and a descendent node in the hierarchical structure includes all tags of an ancestor node in the hierarchical structure;

building, by the processor, a plurality of tag trees based on the hierarchical structure of the tags, each node in a tag tree corresponding to one or more of the video titles;

calculating, by the processor, a total distance penalty D of each of the plurality of tag trees, wherein the total distance penalty D of the tag tree is a sum of a plurality of distance penalties d, wherein d is 1 when there is a conflict between the tag-relationship map and an order in the tag tree, and d is 0 if there is no conflict between the tag-relationship map and the order in the tag tree, and the total distance penalty D is smaller than or equal to a predefined total distance penalty threshold;

determining, by the processor, a tag tree having a minimum value of a total distance in the plurality of tag trees; and controlling, by the processor, a TV display to display the video title in the zoomable user interface based on a location of a node corresponding to the video title in the determined tag tree.

2. The method according to claim 1, after building the plurality of tag trees based on the hierarchical structure of the tags, further comprising:

calculating, by the processor, a total distance L of each of the plurality of tag trees, wherein the total distance L is a sum of distances from a root node to all nodes in the tag tree.

3. The method according to claim 1, after building the plurality of tag trees based on the hierarchical structure of the tags, further comprising:

calculating, by the processor, a coverage expectation value C of each of the plurality of tag trees, wherein the coverage expectation value C is a percentage that the plurality of video titles of the video group appears in a plurality of leave nodes of the tag tree, and the coverage expectation value C is smaller than or equal to a predefined coverage expectation threshold.

4. The method according to claim 1, wherein the plurality of tags of the video title comprises a plurality of visual tags and a plurality of non-visual tags.

5. The method according to claim 4, wherein the step of assigning the plurality of tags to a video title comprises:
obtaining, by the processor, a poster of the video title;
recognizing, by the processor, a foreground object, a background scene, an expressional perception and a relationship indication in the poster; and
assigning, by the processor, the plurality of visual tags to the video title based on the foreground object, the background scene, the expressional perception and the relationship indication in the poster.

6. The method according to claim 4, wherein the step of assigning the plurality of tags to a video title comprises:
obtaining, by the processor, a plurality of video frames of the video title;
calculating, by the processor, an appearance frequency of a plurality of characters in the plurality of video frames;
determining, by the processor, a main character in the video title based on the appearance frequency; and
assigning, by the processor, the plurality of visual tags to the video title based on the determined main character.

7. The method according to claim 1, wherein the step of building the tag-relationship map based on the relationship of the tags, comprises:
obtaining, by the processor, a video content of each of the plurality of video titles of the video group;
building, by the processor, the tag-relationship map representing the hierarchical structure including a foreground object, a background scene, an expressional perception and a relationship indication.

8. The method according to claim 7, wherein the video content is obtained based on a poster of each of the plurality of video titles; or based on an appearance frequency of characters in a plurality video frames of each of the plurality of video titles.

9. The method according to claim 1, wherein the total distance penalty D of each of the plurality of tag trees is calculated by:

$$D = \sum_{all\ pairs} d(t_{i,j}, t_{i+1,j'})$$

wherein a node $t_{i,j}$ represents a j-th node at an i-th level of the tag tree, and $t_{i,j}$ and $t_{i+1,j'}$ represent two nodes of tags in neighbor levels in the tag tree.

10. A television (TV) system, comprising:
a TV set displaying a zoomable user interface, the TV set comprising:
a processor;
a memory coupled to the processor the memory storing a plurality of computer-executable instructions that when executed by the processor, cause the processor to display the zoomable user interface and to perform:
assigning a plurality of tags to a video title and collecting tags of a plurality of video titles in a video group;
building a tag-relationship map based on a relationship of the tags, wherein the tag-relationship map represents a hierarchical structure of the tags in the video group, and a descendent node in the hierarchical structure includes all tags of an ancestor node in the hierarchical structure;
building a plurality of tag trees based on the hierarchical structure of the tags;
calculating a coverage expectation value C of each of the plurality of tag trees, wherein the coverage expectation value C is a percentage that the plurality of video titles of the video group appears in a plurality of leave nodes of the tag tree, and the coverage expectation value C is smaller than or equal to a predefined coverage expectation threshold; and
displaying the zoomable user interface having a minimum value of the total distance of the tag tree on the TV set.

11. The TV system according to claim 10, wherein the processor is further caused to perform:
calculating a total distance L of each of the plurality of tag trees, wherein the total distance L is a sum of distances from a root node to all nodes in the tag tree.

12. The TV system according to claim 10, wherein the processor is further caused to perform:
calculating a total distance penalty D of each of the plurality of tag trees, wherein the total distance penalty D of the tag tree is a sum of a plurality of distance penalties d, d is 1 when there is a conflict between the tag-relationship map and an order in the tag tree, d is 0 when there is no conflict between the tag-relationship map and the order in the tag tree, and the total distance penalty D is smaller than or equal to a predefined total distance penalty threshold.

13. The TV system according to claim 12, wherein the total distance penalty D of each of the plurality of tag trees is calculated by:

$$D = \sum_{all\ pairs} d(t_{i,j}, t_{i+1,j'})$$

, wherein a node $t_{i,j}$ represents a j-th node at an i-th level of the tag tree, and $t_{i,j}$ and $t_{i+1,j'}$ represent two nodes of tags in neighbor levels in the tag tree.

14. The TV system according to claim 10, wherein the plurality of tags of the video title comprises a plurality of visual tags and a plurality of non-visual tags.

15. The TV system according to claim 14, wherein the processor is further caused to perform:
obtaining a poster of the video title;
recognizing a foreground object, a background scene, an expressional perception and a relationship indication in the poster; and
assigning the plurality of visual tags to the video title based on the foreground object, the background scene, the expressional perception and the relationship indication in the poster.

16. The TV system according to claim 14, wherein the processor is further caused to perform:
obtaining a plurality of video frames of the video title;
calculating an appearance frequency of a plurality of characters in the plurality of video frames;
determining a main character in the video title based on the appearance frequency; and
assigning the plurality of visual tags to the video title based on the determined main character.

17. The TV system according to claim 10, wherein the processor is further caused to perform:
obtaining a video content of each of the plurality of video titles of the video group;
building the tag-relationship map representing the hierarchical structure including a foreground object, a background scene, an expressional perception and a relationship indication.

18. The TV system according to claim 17, wherein the video content is obtained based on a poster of each of the plurality of video titles; or based on an appearance frequency of characters in a plurality video frames of each of the plurality of video titles.

19. A method for making a zoomable user interface for a television (TV) system, comprising:
assigning, by a processor of the TV system, a plurality of tags to a video title;
collecting, by the processor, tags of a plurality of video titles of a video group;
building, by the processor, a tag-relationship map based on a relationship of the tags, wherein the tag-relationship map represents a hierarchical structure of the tags in the video group, and a descendent node in the hierarchical structure includes all tags of an ancestor node in the hierarchical structure;
building, by the processor, a plurality of tag trees based on the hierarchical structure of the tags, each node in a tag tree corresponding to one or more of the video titles;
calculating, by the processor, a coverage expectation value C of each of the plurality of tag trees, wherein the coverage expectation value C is a percentage that the plurality of video titles of the video group appears in a plurality of leave nodes of the tag tree, and the coverage expectation value C is smaller than or equal to a predefined coverage expectation threshold;
determining, by the processor, a tag tree having a minimum value of a total distance in the plurality of tag trees; and
controlling, by the processor, a TV display to display the video title in the zoomable user interface based on a location of a node corresponding to the video title in the determined tag tree.

* * * * *